United States Patent [19]

Leavens

[11] 4,456,021

[45] Jun. 26, 1984

[54] SINK WITH COLANDER

[75] Inventor: William H. Leavens, Midland, Canada

[73] Assignee: Waltec, Inc., Midland, Canada

[21] Appl. No.: 422,658

[22] Filed: Sep. 24, 1982

[30] Foreign Application Priority Data

Feb. 22, 1982 [CA] Canada .................................. 396730

[51] Int. Cl.³ .............................................. B08B 3/04
[52] U.S. Cl. ..................................... 134/85; 134/104; 134/115 R; 4/630
[58] Field of Search ...................... 134/84–85, 134/104, 115 R, 115 G, 201; 4/187 R–190; 312/228

[56] References Cited

U.S. PATENT DOCUMENTS

| | | | |
|---|---|---|---|
| 858,628 | 7/1907 | Ross | 312/228 X |
| 2,005,459 | 6/1935 | Finn | 4/290 |
| 2,194,343 | 3/1940 | Wexler | 4/187 |
| 2,334,293 | 11/1943 | Stein | 4/189 |
| 2,447,788 | 8/1948 | Ball | 4/187 |
| 2,658,205 | 11/1953 | Bowden | 4/189 |
| 3,126,552 | 3/1964 | Scharmer | 4/187 |
| 3,346,886 | 10/1967 | Kasiwamura | 4/187 |
| 3,387,903 | 6/1968 | Karlen | 312/228 |
| 4,041,964 | 8/1977 | Shamoon | 134/115 R |

FOREIGN PATENT DOCUMENTS

| | | |
|---|---|---|
| 33599 | 1/1890 | Canada . |
| 338445 | 1/1934 | Canada . |
| 373546 | 5/1938 | Canada . |
| 457457 | 6/1949 | Canada . |
| 507511 | 11/1954 | Canada . |
| 1082611 | 7/1980 | Canada . |

Primary Examiner—Robert L. Bleutge
Attorney, Agent, or Firm—Charles W. Fallow; Martin P. Hoffman; Mitchell B. Wasson

[57] ABSTRACT

Disclosed is an arrangement which enables highly efficient and convenient food preparation. The arrangement comprises a sink having two adjacent basins. A colander and a cutting board are arranged in one of the sinks in such a way that the cutting board is supported by the top edge of the sink while the colander is slidably supported on rails beneath the cutting board. The colander is conveniently storable beneath the cutting board but, in use, is simply slid out from beneath the cutting board whereby food chopped up on the cutting board can be scraped off into the colander for rising or draining. An overflow region may be provided in the dividing wall between the two sinks so that if one sink becomes blocked, water overflows into the second sink, and hence to the drain, rather than overflowing onto the floor.

6 Claims, 2 Drawing Figures

SINK WITH COLANDER

BACKGROUND OF THE INVENTION

This invention relates to an arrangement for use in food preparation.

In food preparation, it is common to use a cutting board for cutting up vegetables and a colander for rinsing and draining them. During draining, the colander, is, of course, placed in or over a sink. Typically, the colander is stored in a cupboard and the cutting board either in a cupboard or on top of a counter. The arrangement according to the invention provides for highly efficient and convenient use and storage of a cutting board and colander in association with a sink.

U.S. Pat. No. 4,041,964 of Shamoon, issued Aug. 16, 1977, discloses a cutting board which is provided with a cutting surface adapted for positioning over a sink basin. A flange depends from the front side of the cutting board for abutting engagement with the counter top whereby the cutting board can be secured by a person leaning against the flange. A wire mesh basket is adapted to be secured in an aperture formed in the cutting surface of the board. It is necessary to remove the basket to expose the aperture so that food trimmings can be deposited into the sink. Furthermore, if the rim and/or handles of the cutting basket extend above the top cutting surface, one has to be careful not to hit them with a knife which, of course, could ruin the cutting edge of the knife.

In the present invention, the cutting board is supported by the edge of the sink and the colander slides on rails at opposite sides of the sink whereby the colander can be slid beneath the cutting board so that food trimmings can easily be scraped off into the sink. Alternatively, the colander can be pulled out from beneath the cutting board, whereby chopped up food can be scraped off into the colander for rinsing and draining.

Canadian Pat. No. 338,445 of Howe, issued Jan. 8, 1934, discloses an arrangement comprising a drain drawer or tray which functions as a strainer and which can be slidably drawn in or out from one end of the sink. However, room has to be provided to draw out the drawer and a separate drain has to be provided (connected to the main drain). The arrangement is more complicated than the present invention and physically less attractive.

SUMMARY OF THE INVENTION

According to the present invention, there is provided an arrangement for use in food preparation comprising a sink having at least one basin, a colander and a cutting board, said basin having first and second opposite walls which have substantially parallel top edges and are each provided with an inwardly extending rail parallel with the top edge and a predetermined distance below it, the colander having parallel opposite ends which rest on the rails, the colander being slidable along the rails, the cutting board having parallel opposite end portions which overlie the top edges of said two opposite walls and a main portion extending between the end portions and extending downwardly below the top edges of the walls a distance less than said predetermined distance whereby the cutting board and colander are independently slidable between third and fourth walls joining said first and second walls.

BRIEF DESCRIPTION OF THE DRAWINGS

The invention will now be further described in conjunction with the accompanying drawings, in which.

DESCRIPTION OF THE PREFERRED EMBODIMENTS

Figure 1:
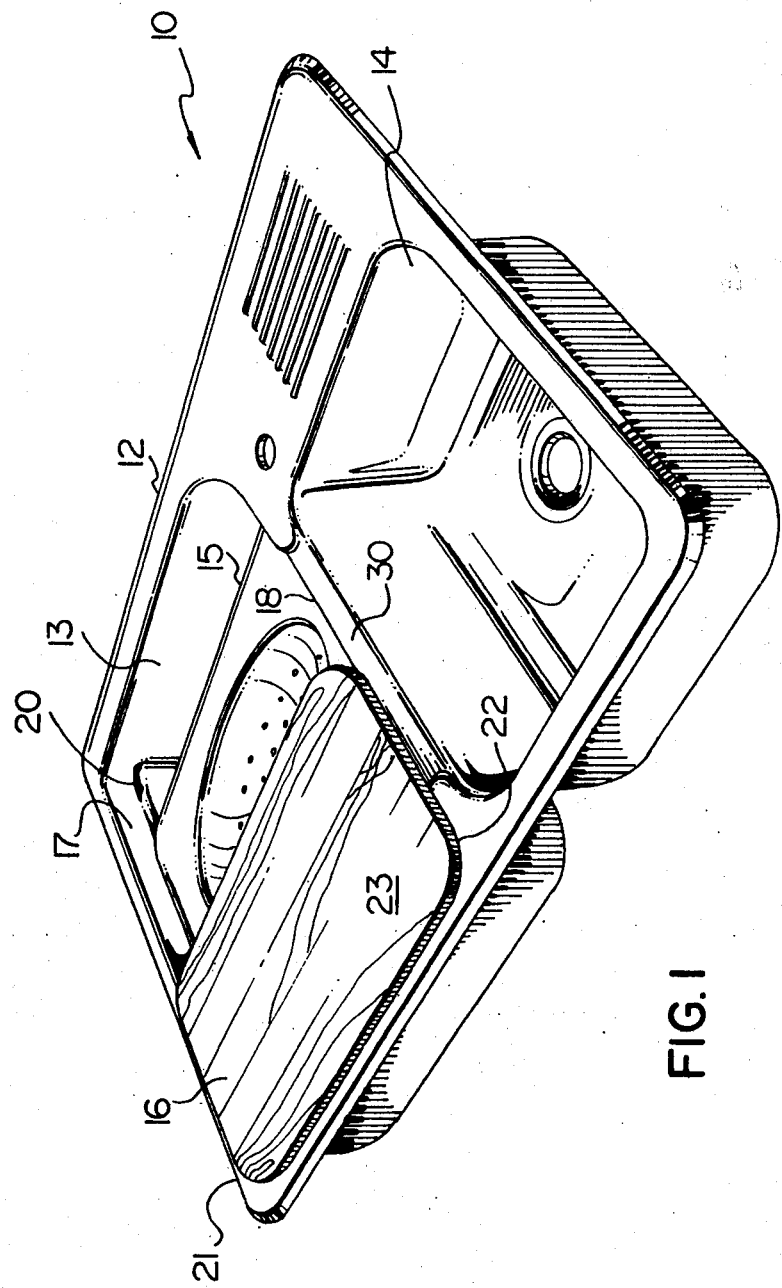
FIG. 1 is a perspective view of a first embodiment according to the invention.
Figure 2:
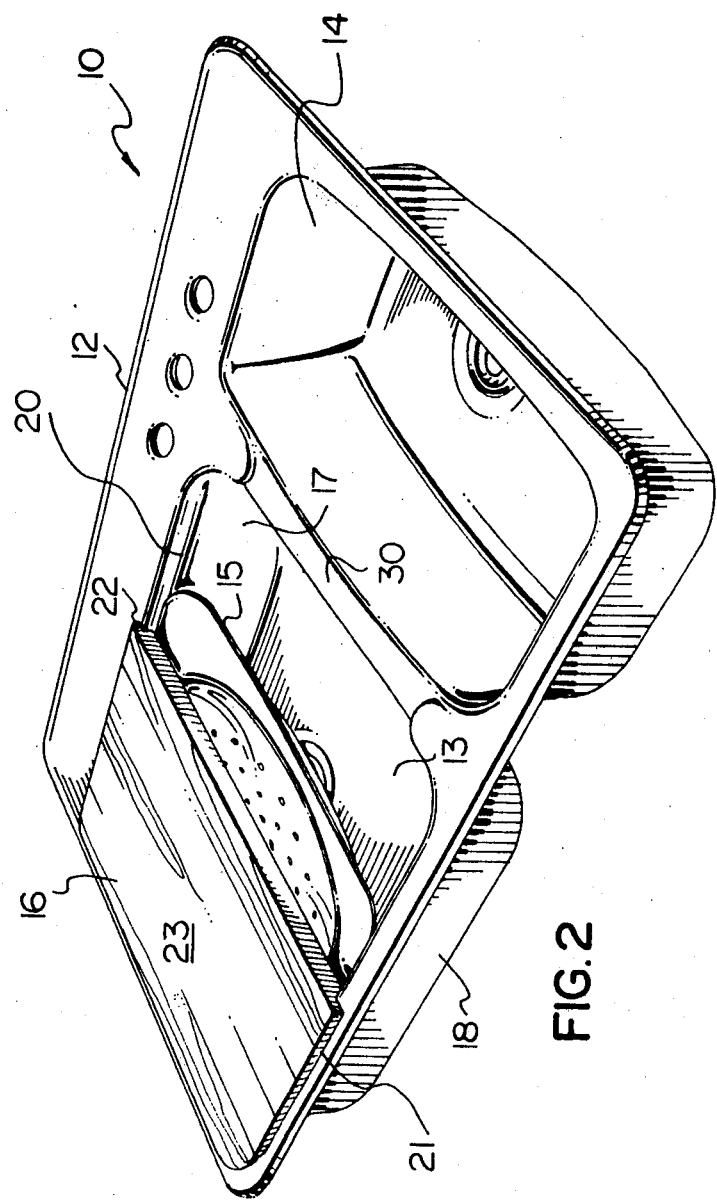
FIG. 2 is a perspective view of a second embodiment according to the invention.

Referring to FIGS. 1 and 2, the food preparation arrangement according to the invention, generally designated 10, comprises a sink 12 having first and second adjacent basins 13 and 14, a colander 15 and a cutting board 16. The first basin 13 has first and second opposite walls 17 and 18 which have substantially parallel top edges and are each provided with an inwardly extending rail parallel with the top edge and a predetermined distance below it. In FIGS. 1 and 2, only the rail on wall 17 can be seen, it being designated by reference numeral 20. The colander 15 has parallel opposite ends, not referenced, which rest on the rails, the colander being slidable along the rails.

The cutting board has parallel opposite end portions 21 and 22 (better seen in the embodiment of FIG. 2) which overlie the top edges of the two opposite walls 17 and 18. A main portion 23 of the cutting board 16 extends between the end portions and, as best seen in the FIG. 2 embodiment, extends downwardly below the top edges of the walls a distance less than the distance of the rails below the top edge. By this means, the cutting board and colander are independently slidable between the walls joining the first and second walls. In practice, the cutting board would probably not be moved, although it could be turned 180° and placed at the opposite end of the basin if desired. Note that the cutting board is very securely held against longitudinal movement by virtue of the end portions 21 and 22 overlying the top edges of the sink walls and the central portion projecting downwardly in the sink basin.

In both FIGS. 1 and 2, the colander is shown partly disposed beneath the cutting board 23 but it will be appreciated that the colander can be slid completely beneath the cutting board or pulled completely out from under it.

It will be obvious that the FIG. 2 embodiment is essentially the same as the FIG. 1 embodiment, the only difference being that in FIG. 1 the colander slides forwards and back, whereas in FIG. 2 it slides from left to right.

Preferably, an overflow means 30 is provided between the two sink basins. In this manner, should one sink become blocked, water can overflow into the other sink and exit its drain, assuming it is not also blocked, instead of overflowing onto the kitchen floor.

The basin 14 may be smaller than the basin 13 although, of course, it need not be.

The combined widths of the cutting board and colander are preferably less than the length (FIG. 1) or width (FIG. 2) of the sink basin with which they are associated, although this is not essential as long as most of the colander can be withdrawn, for use, from beneath the cutting board.

The rails are preferably integrally formed in the sink walls, e.g. by a stamping or pressing operation.

What is claimed is:

1. An arrangement for use in food preparation comprising a sink having at least one basin, a colander and a cutting board, said basin having first and second opposite walls which have substantially parallel top edges and are each provided with an inwardly extending rail parallel with the top edge and a predetermined distance below it, the colander having parallel opposite ends which rest on the rails, the colander being slidable along the rails, the cutting board having parallel opposite end portions which overlie the top edges of said two opposite walls and a main portion extending between the end portions and extending downwardly below the top edges of the walls a distance less than said predetermined distance whereby the cutting board and colander are independently sidable between third and fourth walls joining said first and second walls.

2. An arrangement as claimed in claim 1 wherein the combined widths of the cutting board and colander are less than the distance between said third and fourth walls.

3. An arrangement as claimed in claim 2 wherein the width of the colander is no greater than the width of the cutting board whereby the colander may be slid completely beneath the cutting board.

4. An arrangement as claimed in claim 3 wherein said sink comprises first and second adjacent basins and means are provided whereby water may overflow from one basin into the other.

5. An arrangement as claimed in claim 2 wherein said sink comprises first and second adjacent basins and means are provided whereby water may overflow from one basin into the other.

6. An arrangement as claimed in claim 1 wherein said sink comprises first and second adjacent basins and means are provided whereby water may overflow from one basin into the other.

* * * * *